Feb. 4, 1958  R. MERBLER  2,822,182
BEARING MOUNTING FOR ROLLER-SKATE TRUCK
Filed Nov. 4, 1955

INVENTOR.
RUDOLPH MERBLER
BY
McMorrow, Berman + Davidson
ATTORNEYS

United States Patent Office 2,822,182
Patented Feb. 4, 1958

2,822,182

BEARING MOUNTING FOR ROLLER-SKATE TRUCK

Rudolph Merbler, Schenectady, N. Y.

Application November 4, 1955, Serial No. 544,980

1 Claim. (Cl. 280—11.28)

The present invention relates to a roller-skate wheel truck.

An object of the present invention is to provide a roller-skate wheel truck for precision roller-skates in which a minimum number of bearing assemblies are used, and one which therefore may be manufactured at a lower cost than roller-skate wheel trucks presently manufactured, and one which transmits to the skater's foot less vibration caused by the skate wheels when they roll upon a surface than roller-skate wheel trucks presently in use.

Another object of the present invention is to provide a roller-skate wheel truck of sturdy construction, one having means for lubricating both skate wheels simultaneously and without disassembly of the skate wheels from the truck.

A further object of the present invention is to provide a roller-skate wheel truck in which means is provided to cause the wheels to roll smoothly and with great flexibility, and which enables the user to skate with ease and better balance for making turns.

A still further object of the present invention is to provide a roller-skate wheel truck which has means which assures the even wear of the surface of the roller-skate wheels thereby permitting the use of the wheels over a greater period of time without replacement.

Figure 1:
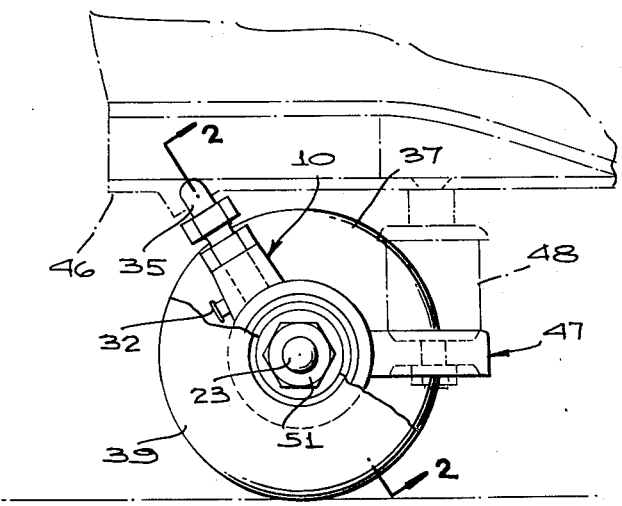
Figure 2:
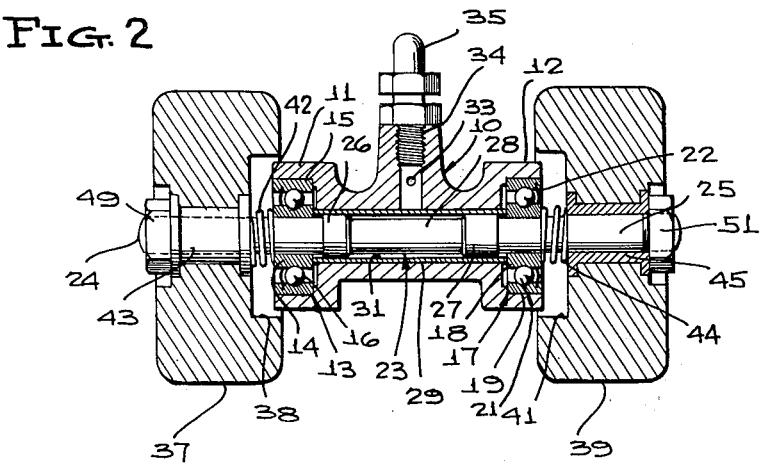

These and other objects and advantages of the present invention will be fully apparent from the following description when taken in connection with the annexed drawing, in which:

Figure 1 is a side elevational view of a portion of a roller-skate showing the roller-skate truck of the present invention with a portion of one wheel of the roller skate broken away, the dotted line showing indicating a portion of a shoe supported upon the roller skate, and Figure 2 is a sectional view taken on the line 2—2 of Figure 1.

Referring in greater detail to the drawing in which like numerals indicate like parts throughout the several views, the lower skate truck of the present invention comprises an open-ended axle housing 10 having enlarged portions adjacent each end, the portions forming bearing bosses 11 and 12. An antifriction bearing assembly 13 is positioned within the boss 11 and includes an inner ball race 14, an outer ball race 15, and a plurality of ball elements 16 interposed between the inner ball race 14 and the outer ball race 15. Another antifriction bearing assembly 17 is positioned within the boss 12 and also includes an inner ball race 18, an outer ball race 19, and a plurality of ball elements 21 interposed between the inner ball race 18 and the outer ball race 19. The outer ball races 15 and 19 are press-fitted into the open ends of the bosses 11 and 12, respectively. Each of the bearing assemblies 13 and 17 is provided with a protective cover ring 22 of conventional manufacture.

An axle 23 extends through the axle housing 10 and is rotatably supported in the inner ball races 14 and 18 of the bearing assemblies 13 and 17, respectively.

The axle 23 has one portion 24 adjacent one end positioned exteriorly of the open end of the housing adjacent the boss 11 and has another portion 25 adjacent the other end of the axle exteriorly of the other of the open ends of the housing which is adjacent the bearing boss 12.

A pair of collars 26 and 27 are arranged in spaced relation on the part of the axle 23 which is within the housing 10 and between the bearing assemblies 13 and 17. This part of the axle is designated by the reference numeral 28. A sleeve 29 surrounds the axle part 28 and is loosely fitted within the bore 31 provided for the axle 23 and loosely contacts the collars 26 and 27 and rotates with the axle 23 and the inner ball races 14 and 18. The ends of the sleeve 29 bear against the inner ends of the inner ball races 14 and 18 and the sleeve serves as a spacer for the latter. A grease fitting 32 shown in Figure 1 provides means for introducing lubricant through the hole 33 in the axle housing 10 which communicates with the partially-threaded bore 34 in the axle housing 10, the bore 34 receiving a support post 35 of conventional make. Lubricant introduced through the grease fitting 32 flows through a hole 33 in the axle housing 10, through the bore 34, and thence into the passage formed by the looseness of the sleeve 29 within the bore 31 of the axle housing 10, and thence outwardly to the inner ends of the inner and outer ball races 14 and 18, and 15 and 19, respectively.

A wheel 37 having a recess 38 on its inner face is connected to the axle portion 24 for rotational movement about the axle portion 24 as an axis and another wheel 39 having a recess 41 on its inner face is connected to the axle portion 25 for rotational movement about the axle portion 25 as an axis. A helical spring 42 is circumposed about the axle 23 intermediate the bearing assembly 13 and the adjacent wheel 37 and has one end bearing against the inner ball race 14 of the bearing assembly 13 and has its other end bearing against the adjacent end of a bushing 43 which supports the wheel 37 upon the axle portion 24. Another helical spring 44 is circumposed about the axle 23 intermediate the bearing assembly 17 and the adjacent wheel 39 and has one end bearing against the inner ball race 18 of the bearing assembly 17 and has its other end bearing against the one end of a bushing 45 which supports the wheel 39 upon the axle portion 25.

The support post 35 is received by its upper end with a recess provided in the roller-skate frame 46 adjacent the heel portion of the latter and a forwardly-projecting boss 47 supports the lower end of a conventional resilient support member 48, the upper end of the latter being fixedly secured to the roller-skate frame 46.

In use, the axle 23 rotates within the bore 31 in the axle housing 10 and is press fitted to the inner ball races 14 and 18. The axle part 28 between the collars 26 and 27 permits the flexing of the axle 23 when a radial load or lateral deflection is applied to either of the wheels 37 or 39, the axle preferably being fabricated of spring steel or hardened and tempered steel rod. This flexing of the axle greatly reduces the pressure applied vertically and axially to the outer edges of each of the wheels 37 and 39 and permits the wheels to wear uniformly across the rolling surfaces.

The wheels 37 and 39 are molded about the bushings 43 and 45, respectively, and the springs 42 and 44 restrain the rotational movements of the bushings 43 and 44 about the adjacent axle portions 24 and 25. Nuts 49 and 51 upon the ends of the axle 23 are drawn up tightly against the bushings 43 and 45, respectively, and compress the springs 42 and 44 into light frictional engagement with the adjacent ends of the bushings and the adjacent inner ball races. This independent yet restrained rotational movement of each of the wheels 37 and 39 with respect to the axle 23 permits great flexibility of the roller-skate while making turns and permits one of the wheels to turn faster than the other in such turns.

When disassembling the wheels from the axle housing of the roller-skate wheel truck of the present invention, either of the nuts 49 or 51 may be removed and axial pressure applied to the axle 23, the collars 26 and 27 serving as shoulders to remove the respective one of the bearing assemblies 13 or 17 from its press-fitted engagement within the respective one of the bosses 11 or 12.

The roller-skate truck of the present invention is therefore seen to have half as many bearings as the roller-skate trucks presently manufactured and in use. This permits the manufacture of precision roller skates at a lower cost than at present and provides a precision roller-skate of sturdy construction and one commercially practical. Due to the fact that the wheels normally rotate with the inner ball races less vibration is transmitted from the rolling wheels to the foot of the skater. The wheels are of simpler and stronger construction than those presently manufactured and may be easily and economically constructed of wood or of plastic as desired.

What is claimed is:

A roller-skate truck comprising an open-ended axle housing, a bearing boss adjacent each of the open ends of said housing, an antifriction bearing assembly including an inner ball race, an outer ball race, and a plurality of ball elements interposed between the inner and outer ball races, housed within each of said bosses, the outer ball race of each bearing assembly being fixed in the adjacent boss, an axle extending through said housing and rotatably supported in the inner ball race of each of said bearing assemblies and having the portion adjacent one end exteriorly of one of the open ends of said housing and having the portion adjacent the other end exteriorly of the other of the open ends of said housing, a wheel connected to each end portion of said axle for rotational movement about said portion as an axis, a helical spring circumposed about the axle intermediate each bearing assembly and the adjacent wheel and having one end bearing against the inner race of said assembly and the other end bearing against said wheel, a pair of collars arranged in spaced relation on the part of said axle within said housing and between said bearing assemblies, and a sleeve surrounding and loosely contacting said collars, said sleeve loosely contacting the adjacent portion of said axle housing and defining a passage for the flow of lubricant therethrough.

References Cited in the file of this patent

UNITED STATES PATENTS

| | | |
|---|---|---|
| 235,887 | Mackay | Dec. 28, 1880 |
| 332,189 | Cropper | Dec. 8, 1885 |
| 2,466,070 | Balstad | Apr. 5, 1949 |
| 2,622,931 | Petrelli et al. | Dec. 23, 1952 |
| 2,722,429 | Merbler | Nov. 1, 1955 |

FOREIGN PATENTS

| | | |
|---|---|---|
| 930,820 | France | Sept. 1, 1947 |
| 2,828 of 1886 | Great Britain | Feb. 26, 1886 |
| 453,425 | Great Britain | Sept. 11, 1936 |